US009192899B2

(12) United States Patent
Sumiya

(10) Patent No.: US 9,192,899 B2
(45) Date of Patent: Nov. 24, 2015

(54) HIGH-HARDNESS CONDUCTIVE DIAMOND POLYCRYSTALLINE BODY AND METHOD OF PRODUCING THE SAME

(75) Inventor: Hitoshi Sumiya, Itami (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 112 days.

(21) Appl. No.: 13/528,511

(22) Filed: Jun. 20, 2012

(65) Prior Publication Data

US 2012/0255236 A1 Oct. 11, 2012

Related U.S. Application Data

(63) Continuation of application No. 10/582,330, filed as application No. PCT/JP2004/018011 on Dec. 3, 2004, now Pat. No. 8,226,922.

(30) Foreign Application Priority Data

Dec. 11, 2003 (JP) .................................. 2003-412648

(51) Int. Cl.
 *B01J 3/06* (2006.01)
 *C01B 31/06* (2006.01)
 *C04B 35/52* (2006.01)
 *C04B 35/626* (2006.01)
 *C04B 35/645* (2006.01)
 *B82Y 30/00* (2011.01)

(52) U.S. Cl.
 CPC ................ *B01J 3/062* (2013.01); *B82Y 30/00* (2013.01); *C01B 31/06* (2013.01); *C04B 35/52* (2013.01); *C04B 35/6261* (2013.01); *C04B 35/645* (2013.01); *B01J 2203/0655* (2013.01); *C04B 2235/421* (2013.01); *C04B 2235/422* (2013.01); *C04B 2235/425* (2013.01); *C04B 2235/427* (2013.01); *C04B 2235/5436* (2013.01); *C04B 2235/5445* (2013.01); *C04B 2235/5454* (2013.01); *C04B 2235/656* (2013.01); *C04B 2235/72* (2013.01); *C04B 2235/781* (2013.01); *C04B 2235/785* (2013.01); *C04B 2235/786* (2013.01); *C04B 2235/96* (2013.01)

(58) Field of Classification Search
 None
 See application file for complete search history.

(56) References Cited

U.S. PATENT DOCUMENTS

| 3,148,161 | A | 9/1964 | Wentorf, Jr. et al. |
| 6,497,853 | B1 | 12/2002 | Davies et al. |
| 6,835,365 | B1 | 12/2004 | Davies et al. |
| 2003/0039603 | A1* | 2/2003 | Meng ............................ 423/446 |
| 2004/0221796 | A1* | 11/2004 | Swain et al. .................... 117/84 |
| 2005/0019114 | A1 | 1/2005 | Sung |
| 2005/0110024 | A1 | 5/2005 | Swain et al. |
| 2007/0144790 | A1* | 6/2007 | Fang et al. .................... 175/434 |

FOREIGN PATENT DOCUMENTS

| EP | 1 055 926 A2 | 11/2000 |
| GB | 1 240 526 A | 7/1971 |
| JP | S63-079757 | 4/1988 |
| JP | 4-74766 A | 3/1992 |
| JP | 4-114966 A | 4/1992 |
| JP | H07-069795 | 3/1995 |
| JP | 9-67195 A | 3/1997 |
| JP | 2001-21521 A | 1/2001 |
| JP | 2001525311 A | 12/2001 |
| JP | 2002500550 A | 1/2002 |
| JP | 2002-180288 | 6/2002 |
| JP | 2002524376 A | 8/2002 |
| JP | 2003292397 A | 10/2003 |
| WO | 0015548 A2 | 3/2000 |
| WO | WO 03/086971 | 10/2003 |
| WO | WO 2004/046062 | 3/2004 |

OTHER PUBLICATIONS

Japanese Office Action (Notice of Grounds of Rejection) with English Translation issued in Patent Application No. 2012-003111 mailed Sep. 24, 2013.
F.P. Bundy, "Direct Conversion of Graphite to Diamond in Static Pressure Apparatus," The Journal of Chemical Physics, Feb. 1, 1963, pp. 631-643, vol. 38, No. 3.
Masao Wakatsuki, et al., "Notes on Compressible Gasket and Bridgman-Anvil Type High Pressure Apparatus," Japanese Journal of Applied Physics, Apr. 1972, pp. 578-590, vol. 11, No. 4.
S. Naka, et al., "Direct conversion of graphite to diamond under static pressure," Nature, Jan. 1 & 8, 1976, pp. 38-39, vol. 259.
Japanese Office Action, with English translation, issued in Japanese Patent Application No. 2005-516815, mailed Nov. 30, 2010.
European Search Report issued in European Patent Application No. EP 0481003 dated Jan. 12, 2009.
Bernard M. et al., "Non-Destructive Determination of the boron concentration of heavily doped metallic diamond thin films from Raman Spectroscopy." Diamond and Related Materials 13 (2004) 282-286.

* cited by examiner

*Primary Examiner* — Guinever S Gregorio
(74) *Attorney, Agent, or Firm* — McDermott Will & Emery

(57) ABSTRACT

A diamond sintered body conventionally used in a cutting tool or the like includes an iron group metal element as a sintering aid, and therefore has a problem in heat resistance. A diamond sintered body not including the iron group metal, on the other hand, does not have sufficient mechanical strength to be used as a tool material, and also does not have conductivity, which makes electrical discharge machining impossible, and thus processing thereof is difficult. A diamond polycrystalline body having high heat resistance and mechanical strength and having conductivity enabling electrical discharge machining is obtained by using only an amorphous or fine graphite-type carbon material as a starting material, adding boron thereto and concurrently performing conversion into diamond and sintering in an ultra-high pressure and temperature condition.

7 Claims, No Drawings

HIGH-HARDNESS CONDUCTIVE DIAMOND POLYCRYSTALLINE BODY AND METHOD OF PRODUCING THE SAME

RELATED APPLICATIONS

This application is a Continuation of U.S. application Ser. No. 10/582,330, filed on Jun. 9, 2006, now U.S. Pat No. 8,226,922, which is the U.S. National Phase under 35 U.S.C. §371 of International Application No. PCT/JP2004/018011, filed on Dec. 3, 2004, which in turn claims the benefit of Japanese Application No. 2003-412648, filed on Dec. 11, 2003, the disclosures of which Applications are incorporated by reference herein.

TECHNICAL FIELD

The present invention relates to a diamond and a method of producing the same. In particular, the present invention relates to a diamond polycrystalline body having high hardness, high strength, good heat resistance, and good oxidation resistance which is used in a cutting tool, a tool such as a dresser or a die, a drill bit, or the like, and to a method of producing the same.

BACKGROUND ART

Patent Document 1: Japanese Patent Laying-Open No. 04-074766
Patent Document 2: Japanese Patent Laying-Open No. 04-114966
Non-Patent Document 1: F. P. Bundy, *J. Chem. Phys.,* 38 (1963) pp. 631-643
Non-Patent Document 2: M. Wakatsuki et al., *Japan. J. Appl. Phys.,* 11 (1972) pp. 578-590
Non-Patent Document 3: S. Naka et al., *Nature,* 259 (1976) p. 38

In a diamond polycrystalline body conventionally used in a cutting tool, a tool such as a dresser or a die, a drill bit, or the like, an iron group metal such as Co, Ni or Fe or ceramic such as SiC is used as a sintering aid or a binder. Use of a carbonate as a sintering aid is also known ([Patent Document 1], [Patent Document 2]). The diamond polycrystalline body as such is obtained by sintering diamond powder together with the sintering aid or binder in a high pressure and temperature condition (generally a pressure of 5-8 GPa and a temperature of 1,300-2,200° C.), in which condition diamond is thermodynamically stable. A naturally occurring diamond polycrystalline body (carbonado or ballas) is also known and is partially used as a drill bit, but is not generally used in industry because of large variations in a material and a small amount of output thereof.

DISCLOSURE OF THE INVENTION

Problems to be Solved by the Invention

A diamond polycrystalline body using an iron based metal catalyst such as Co as a sintering aid includes the sintering aid in a polycrystal, and the sintering aid acts as a catalyst promoting graphitization of diamond, which results in a lower heat resistance. That is, graphitization of diamond occurs at about 700° C. even in an inert gas atmosphere. In addition, the polycrystalline body tends to have fine cracks formed therein because of a difference in thermal expansion between the sintering aid and diamond. Furthermore, since a metal such as Co exists among diamond particles as a continuous layer, a mechanical characteristic of the polycrystalline body such as hardness or strength is deteriorated. Removal of the metal from a grain boundary for increasing heat resistance is also known and, though the heat resistance is increased to about 1,200° C. with this removal, strength of the polycrystalline body is further substantially decreased because the polycrystalline body becomes porous. A diamond sintered body using SiC as a binder has good heat resistance, but strength thereof is low because there is no binding between diamond particles. In addition, though a diamond sintered body using a carbonate as a sintering aid has good heat resistance as compared to a sintered body with a Co binder, a mechanical characteristic thereof is not sufficient because a carbonate material exists in a grain boundary.

On the other hand, as a method of producing a diamond, non-diamond carbon such as graphite, glassy carbon or amorphous carbon can be directly converted into diamond in an ultra-high pressure and temperature condition without a catalyst or a solvent. A polycrystalline body of single-phase diamond can be obtained by performing sintering concurrently with direct conversion from a non-diamond phase to a diamond phase. Each of [Non-Patent Document 1], [Non-Patent Document 2] and [Non-Patent Document 3], for example, discloses that a diamond polycrystalline body can be obtained by direct conversion in an ultra-high pressure and temperature condition of 14-18 GPa and at least 3000 K using graphite as a starting material.

In any such method, however, the ultra-high pressure and temperature condition over 14 GPa and 3000 K is required, which makes a production cost extremely high. In addition, since diameters of diamond particles are not uniform, the mechanical characteristic such as hardness or strength is insufficient. Besides, since the diamond polycrystalline body obtained with this method is an insulator (having a resistivity of at least $10^{13} \Omega$), machining thereof with electrical discharge machining is not possible, which increases a machining cost. In addition, since diamond is oxidized in air at about 700° C. or a higher temperature, when the diamond polycrystalline body is used as a tool used particularly in a severe condition in which a cutting edge becomes a high temperature, the tool may become unusable because of wear or deterioration due to oxidation.

The present invention was made to solve problems of conventional techniques as described above. An object of the present invention is to provide a high-hardness conductive diamond polycrystalline body having sufficient strength, hardness, heat resistance and oxidation resistance and capable of low-cost electrical discharge machining, which can be applied to a cutting tool, a tool such as a dresser or a die, or a drill bit.

Means for Solving the Problems

To solve the above-described problems, in a method of directly converting non-diamond carbon into diamond in an ultra-high pressure and temperature condition, inventors of the present invention used as non-diamond carbon a boron-containing carbon material prepared by mechanically milling and evenly mixing graphite including boron in an inert gas to obtain an ultrafine or amorphous material of at most a few tens of nm. As a result, a conductive and dense diamond polycrystalline body including strongly binding particles having diameters of at most a few tens of nm could be obtained in a sintering condition of lower pressure and temperature as compared to those of a conventional sintering condition. In addition, when amorphous carbon, graphite-type carbon or diamond powder including boron as a solid solution was used as a starting material, a non-diamond phase such as $B_4C$ was not precipitated, and a conductive and dense diamond polycrystalline body including strongly binding diamond particles could be obtained in a sintering condition of lower pressure and temperature as compared to those of the conventional sintering condition, because of a catalytic reaction by boron as the solid solution.

The inventors have also found that the diamond polycrystalline body has substantially higher hardness and strength as well as better heat resistance and oxidation resistance as compared to a conventional polycrystalline body, and is capable of electrical discharge machining.

That is, a high-hardness conductive diamond polycrystalline body according to the present invention is a polycrystalline body formed substantially with diamond, which is formed using an amorphous or fine graphite-type carbon material as a starting material which is subjected to direct conversion sintering to obtain diamond in an ultra-high pressure and temperature condition without addition of a sintering aid or a catalyst thereto, and is characterized in that diamond has a maximum particle diameter of at most 100 nm and an average particle diameter of at most 50 nm, and a diamond particle includes at least 10 ppm and at most 1,000 ppm of boron. With controlling a particle diameter of the diamond particle to be within a range as described above, hardness and strength thereof can be prevented from decreasing. In addition, when a concentration of boron in the diamond particle is less than 10 ppm, sufficient conductivity cannot be obtained and electrical discharge machining becomes difficult. When the concentration becomes higher than 1,000 ppm, on the other hand, a non-diamond phase such as $B_4C$ is precipitated in a diamond sintered body and a mechanical characteristic of the sintered body is deteriorated. With a construction as described above, a diamond sintered body having high hardness, strength and heat resistance and capable of electrical discharge machining can be provided.

Another high-hardness conductive diamond polycrystalline body according to the present invention is a polycrystalline body formed substantially with diamond, which is formed using amorphous carbon, graphite-type carbon or diamond powder including boron as a solid solution as a starting material which is subjected to direct conversion sintering to obtain diamond or to direct sintering in an ultra-high pressure and temperature condition without addition of a sintering aid or a catalyst thereto, and is characterized in that diamond has a maximum particle diameter of at most 10,000 nm and an average particle diameter of at most 5,000 nm, and a diamond particle includes at least 1,000 ppm and at most 100,000 ppm of boron. With controlling a particle diameter of the diamond particle to be within a range as described above, hardness and strength thereof can be prevented from decreasing. In addition, when a concentration of boron in the diamond particle is less than 1,000 ppm, a pressure and temperature condition required for the conversion sintering becomes as high as at least 7.5 GPa and 2,000° C., and increasing of oxidation resistance cannot be expected. When the concentration becomes higher than 100,000 ppm, on the other hand, a non-diamond phase such as $B_4C$ is precipitated in a diamond sintered body and a mechanical characteristic of the sintered body is deteriorated. With a construction as described above, a diamond sintered body having high hardness, strength, heat resistance and oxidation resistance and capable of electrical discharge machining can be provided.

In the high-hardness conductive diamond polycrystalline body according to the present invention, a specific resistance is preferably set to at most 10 Ωcm. This is because electrical discharge machining can be efficiently performed with the specific resistance of at most 10 Ωcm.

In the high-hardness conductive diamond polycrystalline body according to the present invention, diamond forming the sintered body preferably has a maximum particle diameter of at most 50 nm and an average particle diameter of at most 30 nm. This is because strength of the sintered body can be increased by setting the particle diameter of diamond to at most these values.

In addition, the high-hardness conductive diamond polycrystalline body according to the present invention preferably has a hardness of at least 80 GPa, and more preferably has the hardness of at least 110 GPa.

In a method of producing a high-hardness conductive diamond polycrystalline body according to the present invention, graphite including boron is mechanically milled with a tool including a planetary ball mill in an inert gas to form a graphite-type carbon material including amorphous or fine boron, and the graphite-type carbon material is directly converted into diamond and concurrently sintered at a temperature of at least 1,500° C. and in a pressure condition wherein diamond is thermodynamically stable without adding a sintering aid or a catalyst thereto. With this method, a diamond sintered body having high hardness, strength, heat resistance and oxidation resistance and capable of electrical discharge machining can be produced.

In the method of producing a high-hardness conductive diamond polycrystalline body according to the present invention, a maximum particle diameter of the graphite-type carbon material including amorphous or fine boron can be set preferably to at most 100 nm, and more preferably to at most 50 nm.

In the method of producing a high-hardness conductive diamond polycrystalline body according to the present invention, a crystallite size obtained from a half-width of a (002) diffraction line of an X-ray diffraction pattern of the graphite-type carbon material including amorphous or fine boron can be set preferably to at most 50 nm, and more preferably to at most 10 nm. A graphite-type carbon material including amorphous or fine boron, in which the diffraction line is unrecognizable, can also be used.

The high-hardness conductive diamond polycrystalline body according to the present invention is formed with a polycrystalline body formed substantially with diamond and, in terms of hardness and strength of the polycrystalline body, diamond preferably has a maximum particle diameter of at most 10,000 nm and an average particle diameter of at most 5,000 nm, and a diamond particle preferably includes at least 1,000 ppm and at most 100,000 ppm of boron.

In addition, a specific resistance of diamond is preferably at most 1 Ωcm because electrical discharge machining can be performed more readily.

In the diamond polycrystalline body, it is more preferable that diamond have a maximum particle diameter of at most 1,000 nm and an average particle diameter of at most 500 nm.

In addition, the high-hardness conductive diamond polycrystalline body preferably has a hardness of at least 80 GPa, and more preferably at least 110 GPa in terms of hardness, strength and the like.

In a method of producing a high-hardness conductive diamond sintered body according to the present invention, a carbon material including at least 10 ppm and at most 200,000 ppm of boron is directly converted into diamond and concurrently sintered in a pressure condition wherein diamond is thermodynamically stable without adding a sintering aid or a catalyst thereto. With this method, a dense diamond polycrystalline body having high hardness and high strength can be obtained.

In the method of producing as described above, amorphous carbon is preferably used as the carbon material including boron as one embodiment.

In the method of producing as described above, graphite-type carbon is preferably used as the carbon material including boron as another embodiment.

In the method of producing as described above, a material formed with graphite-type carbon and boron carbide is preferably used as the carbon material including boron as a further embodiment.

In the method of producing as described above, it is also preferable that diamond-like carbon be used as the carbon material including boron and be sintered without adding a sintering aid or a catalyst thereto.

Effects of the Invention

With a construction as described above, a diamond polycrystalline body having a good mechanical characteristic, high heat resistance and oxidation resistance, and conductivity at a level enabling electrical discharge machining can be produced.

BEST MODES FOR CARRYING OUT THE INVENTION

Graphite powder including boron added, for example, is used as a starting material which is milled and mixed with a mill such as a planetary ball mill for a few hours in an inert gas atmosphere such as an argon gas or a nitrogen gas to obtain pulverized particles having a maximum particle diameter of at most 100 nm, preferably at most 50 nm. An average particle diameter of fine boron-containing graphite milled as such, which is calculated from a half-width of a (002) diffraction line of an X-ray diffraction pattern, is at most 50 nm, preferably at most 10 nm. A fine or amorphous state in which the (002) diffraction line in the X-ray diffraction pattern is unrecognizable is more preferred. Presence of a coarse graphite particle having a diameter larger than 100 nm, for example, is not preferable because diamond obtained after direct conversion also becomes coarse and a metallographic structure becomes uneven (stress concentration sites are increased and mechanical strength is decreased).

Amorphous or fine boron-containing graphite obtained with a milling step as described above is used to fill a metal capsule formed with Mo, Ta or the like in a highly pure inert gas atmosphere. This filling step should be performed in the highly pure inert gas because milled ultrafine boron-containing graphite is highly active and readily adsorbs gas or water when exposed to air, which inhibits conversion to diamond and sintering. Then, an ultra-high pressure and temperature generation device is used to keep the amorphous or fine boron-containing graphite at a temperature of at least 1,500° C. under a pressure allowing diamond to be thermodynamically stable for a prescribed time. With this, the amorphous or fine boron-containing graphite is directly converted into diamond and concurrently sintered. Added boron is included in a lattice site of a diamond crystal particle to form a P-type semiconductor to exhibit conductivity. As a result, a conductive diamond polycrystalline body is obtained which has an extremely dense and homogeneous metallographic structure formed with strongly binding fine diamond particles having an even diameter.

When a content of boron in the diamond polycrystalline body is at least 10 ppm, an electrical resistance becomes at most about 10 $\Omega$cm and conductivity thereof enables electrical discharge machining. In addition, the polycrystalline body has a very fine and homogeneous metallographic structure formed with particles having a maximum particle diameter of at most 100 nm or an average particle diameter of at most 50 nm, more preferably a maximum particle diameter of at most 50 nm and an average particle diameter of at most 30 nm. As a result, the polycrystalline body has a hardness of at least 80 GPa or sometimes at least 110 GPa, which is higher than that of a diamond single crystal. In addition, graphitization or generation of minute cracks does not occur even in a vacuum at 1,400° C. since a metal catalyst or a sintering aid is not included. In addition, since boron is included as an impurity, a protective film made of boron oxide is formed on a surface by heating in air and oxidation resistance is increased. Furthermore, since the polycrystalline body has conductivity, polishing or cutting with electrical discharge machining is enabled and a cost for product fabrication can be substantially decreased as compared to machining using a grind stone. Therefore, the diamond polycrystalline body of the present invention is characteristically very useful as a cutting tool, a tool such as a dresser or a die, or a drill bit and, besides, capable of production or processing at a low cost.

Powder or a formed body of amorphous carbon or graphite, or powder or a formed body of diamond which includes at least 1,000 ppm of boron in a solid solution is used as a starting material. The powder or formed body of amorphous carbon or graphite including at least 1,000 ppm of boron in a solid solution can be prepared by, for example, processing of a mixture of coke and boron carbide under a normal pressure in a non-oxidative atmosphere at a temperature of at least one thousand and a few hundreds of ° C. The powder or formed body of diamond including at least 1,000 ppm of boron in a solid solution can be obtained from a gas including methane and boron by a chemical vapor deposition (CVD) method.

Such powder or formed body of amorphous carbon, graphite or diamond including at least 1,000 ppm of boron is used to fill a metal capsule formed with Mo, Ta or the like. Then, the ultra-high pressure and temperature generation device is used to keep the starting material at a temperature of at least 1,500° C. under a pressure allowing diamond to be thermodynamically stable for a prescribed time. With this, amorphous carbon or graphite is directly converted into diamond and concurrently sintered. Diamond powder is directly sintered by a solid phase reaction. In this step, boron included in the starting material as a solid solution enters a lattice site of diamond to form a P-type semiconductor to exhibit conductivity. As a result, a conductive diamond polycrystalline body is obtained which has an extremely dense and homogeneous metallographic structure formed with strongly binding diamond particles having an even diameter. When a content of boron in the diamond polycrystalline body is at least 1,000 ppm, an electrical resistance becomes at most about 1 $\Omega$cm and conductivity thereof enables electrical discharge machining.

Particles forming the polycrystalline body have a maximum particle diameter of at most 10,000 nm or an average particle diameter of at most 5,000 nm, more preferably a maximum particle diameter of at most 1,000 nm and an average particle diameter of at most 500 nm to form a fine and homogeneous metallographic structure. In addition, the particles bind to each other very strongly by a catalytic reaction by boron. As a result, the polycrystalline body has a hardness of at least 80 GPa or sometimes at least 110 GPa, which is higher than that of a diamond single crystal. In addition, graphitization or generation of minute cracks does not occur even in a vacuum at 1,400° C. since a metal catalyst or a sintering aid is not included. In addition, since boron is included as an impurity, a protective film made of boron oxide is formed on a surface by heating in air and oxidation resistance is substantially increased. Furthermore, since the polycrystalline body has conductivity, polishing or cutting with electrical discharge machining is enabled and a cost for product fabrication can be substantially decreased as compared to machining using a grind stone. Therefore, the diamond polycrystalline body of the present invention is characteristically very useful as a cutting tool, a tool such as a dresser or a die, or a drill bit and, besides, capable of production or processing at a low cost.

the sample obtained was identified by X-ray diffraction, and particle diameters of constituent particles were examined by the TEM observation. As to a sample which was firmly sintered, a surface thereof was polished to a mirror-smooth state and a hardness of the polished surface was measured with a micro-Knoop hardness tester. Results of this experiment are shown in Table 1. It becomes apparent from these results that, when fine particles of boron-containing graphite milled to have a maximum particle diameter of at most 100 nm or an average particle diameter of at most 50 nm are used as the starting material, conversion into diamond and sintering can be performed in a relatively mild high pressure and temperature condition, and a resulting polycrystalline body has a hardness equivalent to or higher than that of a diamond single crystal (85-110 GPa), which is substantially higher than a hardness of a conventional sintered body with a Co binder (60-80 GPa). In addition, a polycrystalline body including at least 10 ppm of added boron had conductivity, and an electric conductivity thereof was at most 10 Ωcm, which was a level capable of electrical discharge machining.

TABLE 1

| | | Amount of Boron | | Graphite Particle Diameter | | Synthesis Condition | | Product (Diamond Polycrystalline Body) | | | | Content of Boron ppm |
|---|---|---|---|---|---|---|---|---|---|---|---|---|
| | | | | | | | | Maximum Particle | Average Particle | | | |
| | | Added at % | Milling Time h | Maximum nm | Average nm | Pressure GPa | Temperature ° C. | Diameter nm | Diameter nm | Hardness GPa | Resistivity Ω cm | of Boron ppm |
| Example | 1 | 0.1 | 1 h | 100 | 35 | 10 | 2100 | 80 | 40 | 110 | $10^{-2}$~$10^{-1}$ | 1000 |
| | 2 | 0.1 | 2 h | 80 | 25 | 10 | 2100 | 50 | 20 | 110 | $10^{-2}$~$10^{-1}$ | 1000 |
| | 3 | 0.1 | 4 h | 50 | 15 | 10 | 2100 | 35 | 15 | 120 | $10^{-2}$~$10^{-1}$ | 1000 |
| | 4 | 0.01 | 4 h | 50 | 15 | 10 | 2100 | 35 | 15 | 120 | $10^{-1}$~5 | 100 |
| | 5 | 0.1 | 6 h | 30 | ~10 | 8 | 1600 | 30 | 10 | 100 | $10^{-2}$~$10^{-1}$ | 1000 |
| | 6 | 0.1 | 10 h | 20 | <5* | 8 | 1500 | 20 | <10 | 85 | $10^{-2}$~$10^{-1}$ | 1000 |
| Comparative Example | 1 | 0.1 | — | 60 μm | ~10 μm | 15 | 2100 | 1 μm | 80 | 75 | $10^{-2}$~$10^{-1}$ | 1000 |
| | 2 | 0.001 | 4 h | 50 | 15 | 10 | 2100 | 35 | 15 | 120 | >10 | 10 |
| | 3 | — | 4 h | 50 | 15 | 10 | 2100 | 35 | 15 | 120 | ~$10^{13}$ | — |
| | 4 | 0.1 | — | 20 | <5* | 8 | 1200 | (Not Converted to Diamond) | | | | 1000 |

*A(002) diffraction lie of graphite did not appear in Xray diffraction.

EXAMPLES

To graphite having particle diameters of 10-60 μm and a purity of at least 99.95%, amorphous boron powder was added such that an amount of boron to carbon becomes 0.1-0.001 at %. A resulting material was put into a pot made of silicon nitride together with a ball made of silicon nitride having a diameter of 5 mm, and a planetary ball mill device was used to perform mechanical milling thereof in a highly purified argon gas at a rotation number of 500 rpm. A time of milling was varied from 1 to 20 hours to prepare various samples. After the milling, samples were collected in a glove box filled with a highly pure argon gas. Particle sizes of the samples after milling were examined by an SEM or TEM observation, and an average particle diameter (crystallite size) of each sample was obtained with a Scherrer formula from a half-width of a (002) diffraction line of an X-ray diffraction pattern of graphite. In the glove box, each sample was used to fill an Mo capsule and was sealed. The sample was then subjected to processing in various conditions of pressure and temperature for 30 minutes using a belt-type ultra-high pressure generation device. A generated phase of Various amorphous carbon, graphite and CVD-synthesized diamond powder each including boron in a solid solution were used as starting materials. Each starting material was used to fill the Mo capsule and was sealed, which was then subjected to processing in various conditions of pressure and temperature for 30 minutes using the belt-type ultra-high pressure generation device. A generated phase of the sample obtained was identified by X-ray diffraction, and particle diameters of constituent particles were examined by the TEM observation. In addition, a surface of the sample was polished to a mirror-smooth state and a hardness of the polished surface was measured with the micro-Knoop hardness tester. Results of this experiment are shown in Table 2. Samples obtained were polycrystalline bodies formed with diamond. It becomes apparent that conversion into diamond and sintering can be performed in a relatively mild high pressure and temperature condition, and a resulting polycrystalline body has a hardness equivalent to or higher than that of a diamond single crystal (85-110 GPa), which is substantially higher than a hardness of the conventional sintered body with a Co binder (60-80 GPa). In addition, each polycrystalline body had conductivity, and an electric conductivity thereof was at most 1 Ωcm, which was a level capable of electrical discharge machining. Furthermore, an oxidation property of each polycrystalline body estimated in air was at least 10 times that of a diamond polycrystalline body not including boron.

TABLE 2

| | | | Particle Diameter | | | | Product (Diamond Polycrystalline Body) | | | | |
| | | | Content of | of Starting Material | | Synthesis Condition | | Maximum Particle | Average Particle | | | Content of |
| | | Starting Material | Boron at % | Maximum nm | Average nm | Pressure GPa | Temperature °C. | Diameter nm | Diameter nm | Hardness Gpa | Resistivity Ω cm | Boron ppm |
|---|---|---|---|---|---|---|---|---|---|---|---|---|
| Example | 7 | Amorphous Carbon | 1 | — | — | 8 | 1700 | 30 | <10 | 100 | $10^{-1}$~$10^{-2}$ | 10000 |
| | 8 | Amorphous Carbon | 5 | — | — | 8 | 1500 | 20 | <10 | 90 | $10^{-3}$~$10^{-2}$ | 50000 |
| | 9 | Graphite | 1 | 1000 | 500 | 10 | 2100 | 800 | 100 | 110 | $10^{-2}$~$10^{-1}$ | 10000 |
| | 10 | Graphite | 3 | 1000 | 500 | 10 | 2300 | 3000 | 300 | 110 | $10^{-3}$~$10^{-2}$ | 30000 |
| | 11 | Graphite | 10 | 1000 | 500 | 10 | 1800 | 100 | 30 | 110 | ~$10^{-3}$ | 100000 |
| | 12 | CVD Diamond | 2 | 300 | 100 | 12 | 2200 | 300 | 100 | 85 | $10^{-2}$~$10^{-1}$ | 20000 |

INDUSTRIAL APPLICABILITY

As described above, a polycrystalline body of the present invention has very good mechanical characteristics and thermal stability, can be processed at a low cost because of a conductivity thereof which is capable of electrical discharge machining, and is useful for an industrial use such as a cutting tool, a tool such as a dresser or a die, or a drill bit.

The invention claimed is:

1. A high-hardness conductive diamond polycrystalline body formed substantially with diamond, wherein:
    said diamond has a maximum particle diameter of at most 10,000 nm and an average particle diameter of at most 5,000 nm,
    a particle of said diamond includes at least 1,000 ppm and at 100,000 ppm of boron as a solid solution,
    said boron is included in a lattice site of said particle of said diamond,
    said polycrystalline body has a hardness of at least 80 GPa, and
    said high-hardness conductive diamond polycrystalline body is obtained by directly converting a graphite-type carbon material including boron as a solid solution into diamond without adding a sintering aid and catalyst, and concurrently sintering at high temperature and high pressure, so that said boron is included in a lattice site of said particle of said diamond.

2. The high-hardness conductive diamond polycrystalline body according to claim 1, wherein
    said diamond has a specific resistance of at most 1 Ωcm.

3. The high-hardness conductive diamond polycrystalline body according to any of claims 1 and 2, wherein
    said diamond has a maximum particle diameter of at most 1,000 nm and an average particle diameter of at most 500 nm.

4. The high-hardness conductive diamond polycrystalline body according to claim 2, wherein
    said polycrystalline body has a hardness of at least 110 GPa.

5. The high-hardness conductive diamond polycrystalline body according to claim 1, wherein
    said polycrystalline body has a hardness of at least 110 GPa.

6. The high-hardness conductive diamond polycrystalline body according to claim 1, wherein said high-hardness conductive diamond polycrystalline body exhibits a Raman spectrum with an observable peak around 1333 cm$^{-1}$ corresponding to carbons having an sp$^3$ hybrid orbital and no observable peak around 1470 cm$^{-1}$ and 1550 cm$^{-1}$ corresponding to carbons having an sp$^2$ hybrid orbital.

7. A cutting tool comprising the high-hardness conductive diamond polycrystalline body according to claim 1.

* * * * *